Figure 1:
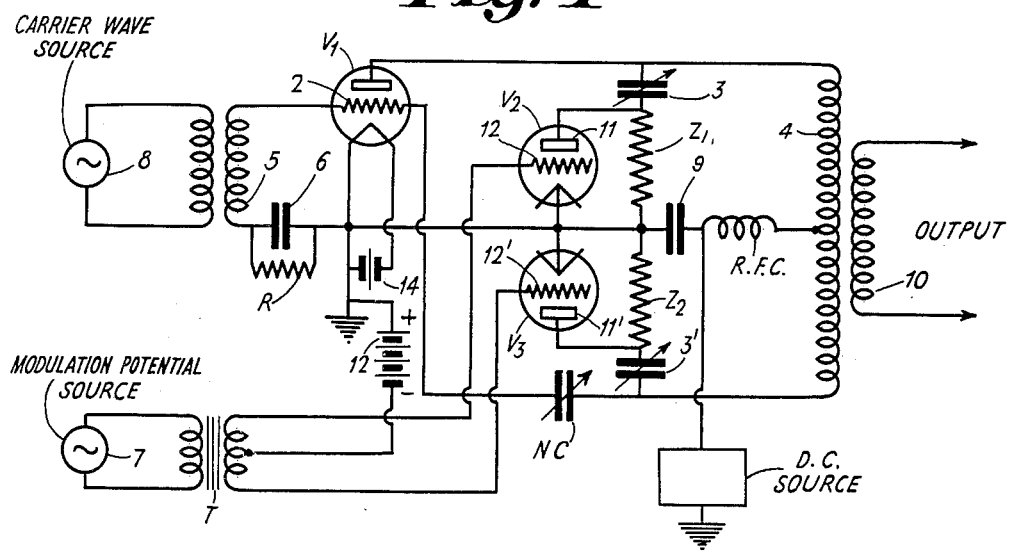

May 23, 1939. G. L. USSELMAN 2,159,237
PHASE MODULATION
Filed Oct. 26, 1935 2 Sheets-Sheet 1

INVENTOR
G. L. USSELMAN
BY H. S. Grover
ATTORNEY

May 23, 1939.　　　G. L. USSELMAN　　　2,159,237
PHASE MODULATION
Filed Oct. 26, 1935　　　2 Sheets-Sheet 2

INVENTOR
G. L. USSELMAN
BY
ATTORNEY

Patented May 23, 1939

2,159,237

UNITED STATES PATENT OFFICE 2,159,237

PHASE MODULATION

George Lindley Usselman, Port Jefferson, N. Y., assignor to Radio Corporation of America, a corporation of Delaware Application October 26, 1935, Serial No. 46,857

18 Claims. (Cl. 179—171)

For various reasons it has been found desirable in the radio and allied arts to signal by means of alternating current of substantially constant amplitude, the current being modulated in one or more of its other characteristics at signal frequency. I propose to supply such a need by providing a novel and simple means whereby wave energy of substantially constant amplitude may be modulated in phase at signal frequency.

More in particular, this application concerns a phase modulator or oscillator, or high frequency vacuum tube relay stage, wherein phase modulation of the high frequency energy is obtained by virtue of the phase shift in the feed back energy occurring with over or under neutralization or, in other words, by regeneration or degeneration. This effect may be accompanied by a small amount of amplitude modulation and a much larger amount of phase modulation if the change in neutralization is not carried too far, and especially if the driving energy or excitation energy is strong.

In a modification, I provide means for protecting the tubes of the modulator or oscillator stage or relay stage in the event of defective operation of any of the circuits thereof.

Figure 2:
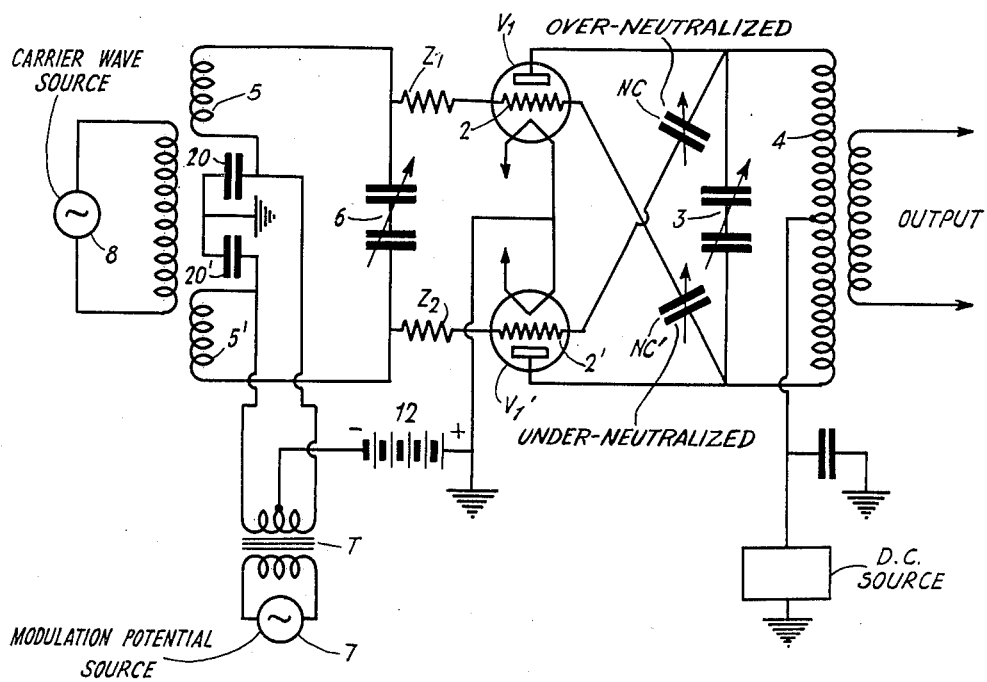
Figure 3:
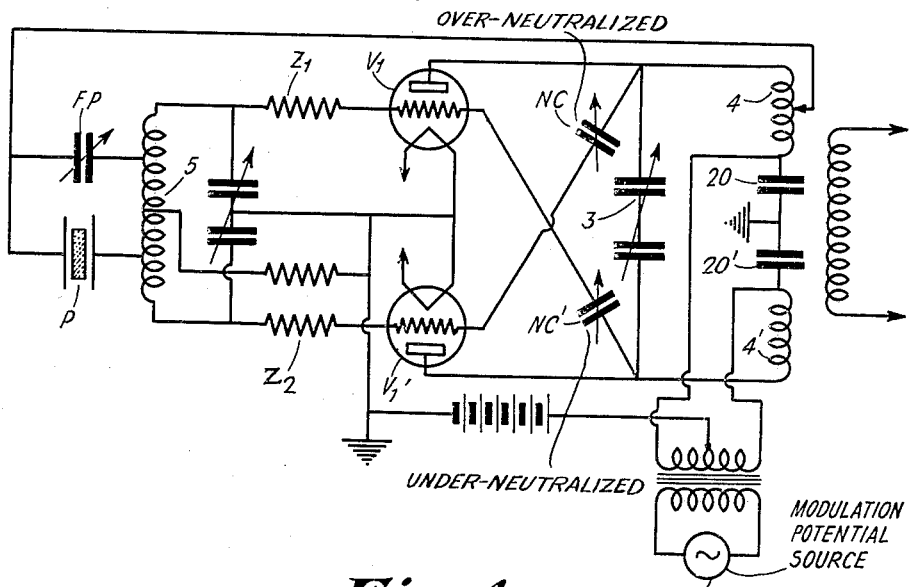
Figure 4:
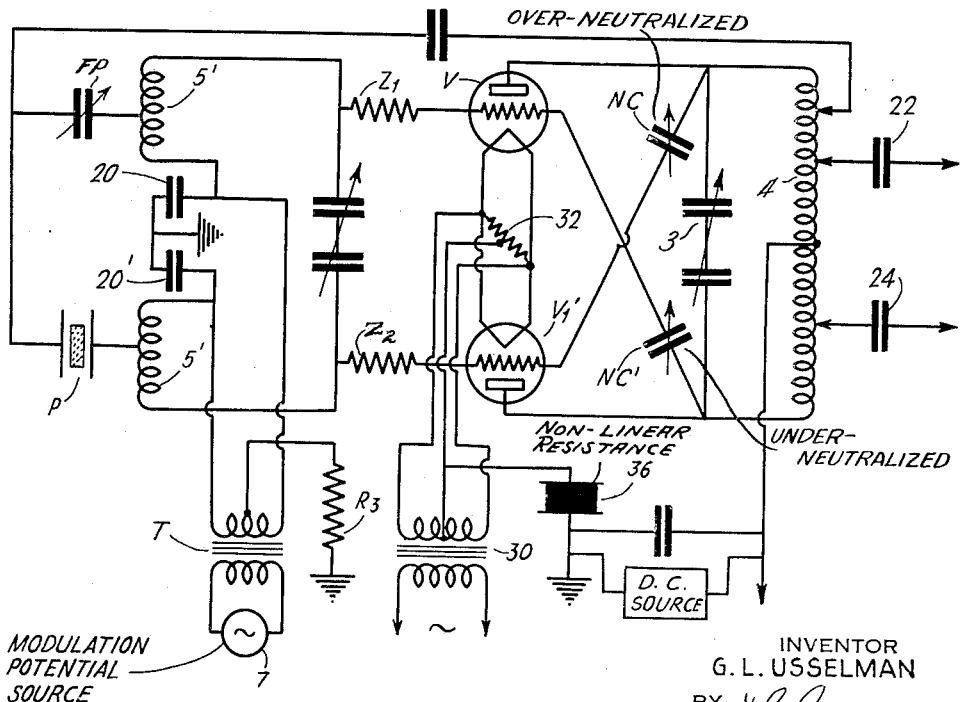

In describing the essential features of my invention, reference will be made to the drawings throughout which like reference characters indicate like parts insofar as possible, and in which:

Figures 1 to 4, inclusive, show for purposes of illustration only, circuit arrangements comprising the essential features of a phase modulation system wherein phase modulation is accomplished by over-neutralizing or under-neutralizing the thermionic stage through which the wave energy is passed. In the circuit of Figure 1 wave energy to be modulated is fed to the input of an electron discharge tube having a plate circuit including a neutralizing portion and including two impedances controllable in opposition at signal frequency to thereby control the state of neutralization or lack thereof to control the phase of the output energy. In Figures 2, 3, 4, the single tube of Figure 2 is replaced by two tubes connected in circuits which are made symmetrical in a sense by cross-connected capacities one of which over-neutralizes and the other of which under-neutralizes its circuit. The tube impedances are controlled to control the phase of the combined output of the tubes. In Figure 3 energy is fed from the output of the tubes to the input so that the tubes generate waves and also phase modulate the same. Figure 3 is otherwise similar broadly in many respects to Figure 2. The circuit of Figure 4 also includes means for protecting the tube in the event defective operation occurs in any of the tube circuits.

Referring to the drawings, and in particular to Fig. 1, $V_1$ is an electron discharge tube of the thermionic type having its control grid 2 coupled by a grid circuit 5, 6, R to an inductance coupled with a source of carrier wave energy 8. The tube $V_1$ has its anode connected by an inductance 4 and choking inductance RFC and blocking condenser 9 to its cathode. The inductance 4 is coupled to the inductance 10 in an output circuit which may lead to any utilized device directly or by way of amplifiers and frequency multipliers and amplitude limiters, etc. The circuit 3, 4, may be tuned to the frequency of the source 8 in the event the oscillations are to be repeated or amplified only, or to a harmonic of said frequency in the event the stage $V_1$ is also to act as a frequency multiplier. A point on the inductance 4 may be coupled to the control grid 2 by means of a neutralizing condenser NC. The circuit described herein comprises a high frequency relay or amplifier or frequency multiplier. The means for phase modulating the high frequency energy in the relay will now be described.

Modulating potentials from source 7 are impressed by way of a transformer T in phase opposition on the control grids 12, 12' of modulator tubes $V_2$ and $V_3$. Impedance elements $Z_1$ and $Z_2$ are connected across the inductance 4 by means of the variable capacities 3, 3'. The anodes 11 and 11' of tubes $V_2$, $V_3$ are connected as shown to the impedances $Z_1$ and $Z_2$. The cathodes of tubes $V_2$ and $V_3$ are connected to the other terminals of the impedances $Z_1$, and $Z_2$ and to the cathode of $V_1$ and to ground. The impedances $Z_1$, $Z_2$ may be inductive or may be a combination of inductance and resistance. Potential for the anode of tube $V_1$ is supplied from a direct current source connected to the inductance 4 by way of the radio frequency choke RFC. Biasing potential for the grids of tubes $V_2$, $V_3$ is supplied from a source 12, connected as shown between a point on the secondary of T and the cathodes of tubes $V_2$, $V_3$. Heating current for the cathode of tube $V_1$ is supplied from any source 14 connected therewith, as shown.

In describing the operation of the phase modulator of Fig. 1, it will be assumed that the stage $V_1$ is normally neutralized by the circuits including the condenser NC. In this case, the reactance of the condenser NC equals the plate-to-grid reactance of tube $V_1$. Also assume that the stage $V_1$ is receiving high frequency wave energy from 8 and delivering the high frequency energy amplified or frequency multiplied or amplified and frequency multiplied to the output circuit 10. Also assume that the audio frequency energy from source 7 is being supplied to the transformer T, and in addition, take an instant when the grid 12 of modulator tube $V_2$ is positive, and the grid 12' of modulator tube $V_3$ is negative. This condition causes the combined impedance of $Z_1$ and $V_2$ to decrease and that of $Z_2$ and $V_3$ to increase. Now, the tank circuit 3, 4 is unbalanced so that it is no longer neutralized with respect to the grid circuit 5, 6, R. In this case, regeneration takes place or there is a tendency to regeneration because energy is fed back through the neutralizing condenser NC (now being at a higher radio frequency voltage) to the grid 2 of $V_1$, thereby overbalancing the energy fed back by way of the internal capacity of the tube from the anode to the grid. In this case, the phase of the energy or oscillations in the anode circuit 3, 4 is advanced ahead of the phase of the oscillations in the grid tank circuit 5, 6.

Now, if we assume an instant in the radio frequency cycle when the grid of $V_3$ is positive and the grid of $V_2$ is negative, conditions will be reversed. The combined impedance of $V_3$ and $Z_2$ will be reduced and the combined impedance of $V_2$ and $Z_1$ will be increased. This causes an unbalance in neutralizing again because the high frequency voltage of the anode end of the circuit 3, 4 is now higher than the frequency voltage of the neutralizing end of the tank circuit 3, 4. In this case, more energy is fed to the grid 2 of $V_1$ from the anode thereof than by way of NC, thereby causing degeneration or a tendency of degeneration, and the phase of the high frequency oscillations in the circuit 3, 4 is retarded with respect to the high frequency oscillations in the grid circuit 5, 6.

It will be seen that with reversal of the direction of current from the audio frequency source 7, corresponding changes in phase will take place in the high frequency energy in the output of stage $V_1$. The frequency of phase shift corresponds to the audio frequency and the degree or amount of phase shift or modulation corresponds to the intensity or amplitude of audio frequency energy. The direction of phase shift corresponds to the direction of audio current.

Phase modulated energy output from stage $V_1$ may be used in any manner desirable. It may be amplified, multiplied in frequency, limited as to amplitude, or one or more of said operations may be accomplished and the energy may then be transmitted over wires or over an antenna.

A practical modification of my invention is shown in Fig. 2, wherein the tubes $V_1$, $V_1'$ are connected as a push-pull amplifier or a frequency multiplier. Neutralizing condensers NC and NC' connect the anode of $V_1$ to the control grid of $V_1'$ and the anode of $V_1'$ to the control grid of $V_1$, respectively. Neutralizing condenser NC is set to slightly over-neutralize the stage, while neutralizing condenser NC' is set to slightly under-neutralize the stage or vice versa. Modulation energy is supplied to the control grids 2 and 2' in phase opposition by way of grid circuit inductances 5 and 5' connected as shown between the secondary winding of transformer T and the control grids of $V_1$ and $V_1'$. These connections include the impedances $Z_1$ and $Z_2$ interposed between the terminals of the tank circuit 5, 5', 6, and the control grids 2 and 2'. The purpose of the impedances $Z_1$ and $Z_2$ is to prevent the grids 2 and 2' from being tied or coupled too tightly to each other by way of the grid tank circuit 5, 5', 6. This allows some elasticity in the grid alternating current voltage, so that the neutralizing condensers as used in their unbalanced relation may have more effect on the control of the oscillations in the tank circuit 5, 5', 6. The secondary of transformer T is shunted by radio frequency bypass condensers 20 and 20'.

As the tubes $V_1$ and $V_1'$ are modulated in phase opposition at signal frequency, the tube delivering the more power to the tank circuit 3, 4 will have the greater control over the phase of the high frequency oscillations in said tank circuit, 3, 4.

In discussing the operation of the modification in Fig. 2, assume that the grid 2 of tube $V_1$ is more positive and the grid 2' of tube $V_1'$ is more negative, since condenser NC' is set for under-neutralizing, tube $V_1$ will be degenerative and the high frequency oscillations in the tank circuit 3, 4, now largely supplied by $V_1$, will be retarded or lagging in phase with respect to the high frequency oscillations in the grid tank circuit 5, 6 and high frequency source 7, 8.

Now, if we assume an instant in the modulation cycle when the grid 2' of tube $V_1'$ is more positive and the grid of tube $V_1$ is more negative, tube $V_1'$ will gain more control over the high frequency oscillations in the tank circuit 3, 4, and since the condenser NC is set for over-neutralizing, regeneration will take place in $V_1'$ and tube $V_1'$ will supply energy having a leading phase so that the oscillations in tank circuit 3, 4 now being controlled by a greater extent by tube $V_1'$ will lead or will have a leading phase with respect to the oscillations in the grid circuit 5, 6 and in high frequency source 8. The phase modulation is the resultant of the combination of the phase shifted feed back oscillations coming through the neutralizing condensers and the constant phase oscillations from the carrier wave source 8. Thus one modulator tube delivers oscillations advanced in phase and the other modulator tube delivers to tank circuit 3, 4 oscillations retarded in phase. These oscillations of different phase are combined in the tank circuit. The result is an oscillating current of shifting phase, when tubes $V_1$ and $V_1'$ are differentially modulated. Different settings of the neutralizing condensers produce differences in the phase of the energy or oscillations fed back to the grids of the modulator tubes. In this manner, phase modulation of controllable degree may be obtained in the circuit of Fig. 2. Impedance elements $Z_1$ and $Z_2$ may be either resistive or inductive or a combination of both.

The modification shown in Fig. 3 is similar in many respects to the modification shown in Fig. 2. However, in Fig. 3, the inductance 4 is replaced by a pair of inductances 4 and 4' connected by way of capacities 20 and 20' to ground to form with the anodes of tubes $V_1$ and $V_1'$ a symmetrical push-pull output circuit. Again the phase shift in feed back energy is accomplished by means of the over-neutralized condenser NC and the under-neutralized condenser NC' or vice versa. Moreover, in Fig. 3, the modulating potentials are supplied from the source 7 to the inductances 4 and 4' and from said inductances to the anodes of tubes $V_1$, $V_1'$ to accomplish anode modulation. The inductances 5 and 5' of Fig. 2 are replaced by a single tapped inductance 5. Oscillations are produced in the tubes $V_1$, $V_1'$ and the circuits rather than being supplied thereto, as in Fig. 2.

Oscillations are produced by supplying energy from the inductance of the anode circuit 4 to the inductance 5 of the grid circuit by way of crystal P, connected as shown The crystal neutralizing condenser FP which is also connected as shown, prevents all oscillations except those controlled by the crystal P. When the tubes and circuits are energized, as shown, high frequency sustained oscillations are produced in the tubes and circuits of a frequency determined by the crystal P or an odd harmonic of the crystal fundamental frequency. In the latter case as in Figure 1, the output circuit is tuned to a harmonic frequency. These oscillations are produced due to the flywheel effect in the circuits ensured by coupling the anode circuit to the grid circuit.

The modification shown in Fig. 3 operates in a manner similar to the modification shown in Fig. 2, except that in Fig. 3 anode modulation is accomplished.

In the arrangement of Fig. 4, grid modulation is accomplished, as in Fig. 2. Oscillations, however, are produced in the tubes $V_1$ and $V_1'$ as in Fig. 3, rather than being supplied thereto from an external source. The phase modulated oscillations are supplied from the tank circuit 4, 3 by way of coupling condensers 22 and 24 to any utilization circuit. In the modification of Fig. 4, the cathodes are energized by alternating current from any source connected to a transformer 30, the secondary winding of which is connected in parallel with the cathodes of $V_1$ and $V_1'$. The electrical center of the secondary winding of transformer 30 is connected to the midpoint of resistor 32 and to one terminal of a non-linear resistance 36, the other terminal of which is connected to ground. The non-linear resistance 36 may be of any type, but is preferably of the type known as "Thyrite". The purpose of the non-linear resistance 36 is to protect the tubes $V_1$, $V_1'$ in the event defective operation occurs in these tubes or circuits. The non-linear resistance 36 has a characteristic such that an increase in current therethrough causes a greater than linear increase in the potential drop therethrough. This potential drop raises the cathodes of $V_1$ and $V_2$ above ground, which has the same effect as increasing the negative bias on the control grids 2 and 2' of tubes $V_1$, $V_1'$. Thus, as the tubes and circuits stop oscillating, the potential drop through $R_3$ decreases, thereby tending to make the grids of the tubes less negative and to increase the plate current. However, the increase in plate current produces a greater than linear potential drop in 36 to increase the positive potential of the cathodes relative to ground to offset the decrease in potential drop through $R_3$.

The operation of the modification in Fig. 4 to accomplish phase modulation is similar in many respects to the operation of the modification in Fig. 2, and a description of such operation need not be repeated at this point.

What is claimed is:

1. A phase modulator comprising in combination, a substantially neutralized electron discharge system, means for impressing wave energy to be phase modulated on said system, means for deriving wave energy from said system, and means for altering the degree of neutralization of said electron discharge system at signal frequency whereby the phase of the energy derived from said system is shifted relative to the phase of the energy impressed on said system.

2. A phase modulator comprising in combination, a pair of thermionic amplifiers, means for impressing wave energy to be phase modulated on said amplifiers, common means for deriving wave energy from said amplifiers, means for under-neutralizing one of said amplifiers, means for over-neutralizing the other of said amplifiers, and means for varying the gain of said amplifiers in accordance with signals to thereby vary the amount of energy which can be derived from each of said amplifiers and consequently the phase of the combined energy which may be derived from said amplifiers.

3. In a phase modulator, a pair of thermionic tubes each having an anode, a cathode and a control grid, a symmetrical circuit coupling said control grids together and to said cathode, a circuit connecting said anodes together and to said cathodes, means for causing wave energy to be modulated to flow in said tubes and circuits, over-neutralizing means connecting the anode of one of said tubes to the control grid of the other of said tubes, under-neutralizing means connecting the anode of said other tube to the control grid of said one tube, and means for modulating the phase of the wave energy flowing in said circuits including a source of modulating potentials connected in phase opposition to like electrodes in said tubes to control the gain of said tubes in opposition to thereby control the phase of the said wave energy.

4. In a phase modulator, a pair of thermionic tubes each having an anode, a cathode and a control grid, a symmetrical circuit coupling said control grids together and to said cathode, a circuit connecting said anodes together and to said cathodes, means for causing wave energy to be modulated to flow in said tubes and circuits, a condenser connecting the anode of one of said tubes to the control grid of the other of said tubes, a condenser connecting the anode of said other tube to the control grid of said one tube, one of said condensers over-neutralizing its circuit, the other of said condensers under-neutralizing its circuit, and means for modulating the phase of the said wave energy in accordance with signals including a source of modulating potentials connected in phase opposition to the grids of said tubes to control the gain of said tubes in opposition.

5. In a phase modulator, a pair of thermionic tubes each having an anode, a cathode and a control grid, an alternating current circuit coupling said control grids together and to said cathode, an alternating current circuit connecting said anodes together and to said cathodes, means for causing wave energy to flow in said tubes and circuits, a neutralizing condenser connecting the anode of one of said tubes to the control grid of the other of said tubes, a neutralizing condenser connecting the anode of said other tube to the control grid of said one tube, one of said tubes being over-neutralized, the other under-neutralized by said condensers, and means for modulating the phase of said wave energy in accordance with signals including a source of modulating potentials connected in phase opposition to the anodes of said tubes to control the gain thereof.

6. In a signalling system, a pair of thermionic devices each having a control grid, an anode and a cathode, a frequency determining circuit connected between the control grids and cathodes of said devices, an alternating current circuit connected between the anodes of said devices and coupled to the frequency determining circuit to cause regeneration in said tubes and circuits to produce therein wave energy, capacities cross-connecting the control grids and anodes of said tubes, said capacities over-neutralizing one of said tubes and under-neutralizing the other of said tubes, a non-linear resistance connected between the control grids and cathodes of said tubes, a source of direct current potential connecting said non-linear resistance between the anodes and cathodes of said tubes and a source of modulating potentials connected in phase opposition between like electrodes in said tubes.

7. In a phase modulation system, a pair of thermionic devices each having a control grid, an anode and a cathode, a frequency determining circuit connected between the control grids and cathodes of said devices, an alternating current circuit connected between the anodes of said tubes, a piezo electric crystal coupling said alternating current circuit to the frequency determining circuit to produce feedback between said circuits and generate oscillations in said tubes and circuits, capacities cross-connecting the control grids and anodes of said tubes, said capacities over-neutralizing one of said tubes and under-neutralizing the other of said tubes, a source of modulating potential connected with like electrodes in said tubes, a non-linear resistance connected between the control grids and cathodes of said tubes, and a source of direct current potential connecting said non-linear resistance between the anodes and cathodes of said tubes.

8. In a phase modulation system, a pair of electron discharge devices each having a control grid, an anode and a cathode, a frequency determining circuit connected between the control grids and cathodes of said devices, an alternating current circuit connected between the anodes of said tubes and coupled to the frequency determining circuit to produce regeneration in said tubes to produce therein wave energy, capacities cross-connecting the control grids and anodes of said tubes, one of said tubes being over-neutralized by said capacities, the other of said tubes being under-neutralized by said capacities, a source of modulating potentials connecting the control grids of said tubes in phase opposition, a non-linear resistance connected between the control grids and cathodes of said tubes, and a source of potential connecting said non-linear resistance between the anodes and cathodes of said tubes.

9. The method of converting a regenerative oscillator of the push pull type in which a pair of thermionic tubes have their anode, cathode, and control grid electrodes connected in oscillation generating circuits into a phase modulator, which includes the steps of, over-neutralizing one of said tubes, under-neutralizing the other of said tubes, and controlling the gain of said tubes oppositely at signal frequency to thereby control the energy produced by said tubes oppositely and consequently control the phase of their combined energies.

10. A phase modulator as recited in claim 3 wherein said symmetrical circuit coupling said control grids together includes an impedance for decoupling said control grids.

11. The method of producing phase modulation of oscillatory energy at signal frequency by means of a substantially neutralized thermionic wave energy repeater having input and output oscillatory circuits in which wave energy is caused to flow, which includes the steps of, feeding wave energy from the output of said repeater to the input of said repeater, and varying the degree of neutralization of said repeater at signal frequency to vary the phase of said wave energy at signal frequency.

12. In a phase modulator in combination, amplifying means including an electron discharge tube system having electrodes connected in input and output circuits wherein high frequency currents are caused to flow, a pair of dissimilar energy feedback paths from said output to said input circuits and means for varying the ratio of energies fed back through said feedback paths in accordance with signalling potentials to thereby vary the phase of the high frequency currents caused to flow in said output circuit.

13. In a phase modulation system, a pair of electron discharge devices each having a cathode, a controlling electrode and an auxiliary electrode, a resonant frequency controlling circuit coupling said controlling electrodes together and to said cathode, a circuit resonant at substantially the frequency of said first circuit connecting said auxiliary electrodes together and to said cathodes, means for causing wave energy to be modulated to flow in said devices and circuits, over-neutralizing means coupling the auxiliary electrode of one of said devices to the controlling electrode of the other of said devices, under-neutralizing means coupling the auxiliary electrode of the other of said devices to the controlling electrode of said one device, and means for modulating the phase of the wave energy flowing in said circuits and devices including a source of modulating potentials connected in phase opposition to like electrodes in said devices to control the gain of said devices in opposition at signal frequency to thereby control the phase of the said wave energy at signal frequency.

14. In a phase modulation system, a pair of electron discharge devices each having a cathode, a controlling electrode and an auxiliary electrode, a resonant frequency determining circuit coupling said controlling electrodes together and to said cathode, a circuit resonant at substantially the frequency of said first circuit coupling said auxiliary electrodes together and to said cathodes, means including regenerative feedback coupling between said first and second circuits for causing wave energy to flow in said devices and circuits, over-neutralizing means coupling the auxiliary electrode of one of said devices to the controlling electrode of the other of said devices, under-neutralizing means coupling the auxiliary electrode of said other of said devices to the controlling electrode of said one device, and means for modulating the phase of the wave energy flowing in said circuits including a source of modulating potentials connected in phase opposition to like electrodes in said device to control the gain of said devices substantially in opposition to thereby control the phase of the wave energy.

15. In a phase modulation system, a pair of electron discharge devices each having an anode, a cathode and a control grid, a resonant frequency controlling circuit coupling said control grids together and to said cathode, a circuit resonant at substantially the frequency of said first circuit coupling said anodes together and to said cathodes, means for causing wave energy to be modulated to flow in said devices and circuits, over-neutralizing means coupling the anode of one of said devices to the control grid of the other of said devices, under-neutralizing means coupling the anode of said other device to the control grid of said one device, and means for modulating the phase of the wave energy flowing in said circuits including a source of modulating potentials connected substantially in phase opposition to said anodes of said devices to control the gain of said devices substantially in opposition at signal frequency to thereby control the phase of the said wave energy.

16. A modulation system as recited in claim 13 wherein impedances for de-coupling said controlling electrodes are included in said coupling between said first resonant frequency controlling circuit and said controlling electrodes.

17. A modulation system as recited in claim 14 wherein impedances for de-coupling said controlling electrodes are included in said coupling between said first resonant frequency controlling circuit and said controlling electrodes.

18. A phase modulation system as recited in claim 15 wherein said means for causing wave energy to be modulated to flow in said devices and circuits includes regenerative feedback means coupled between said first and second circuits.

GEORGE LINDLEY USSELMAN.